United States Patent [19]

Kuljis

[11] Patent Number: 5,156,636
[45] Date of Patent: Oct. 20, 1992

[54] ULTRASONIC METHOD AND APPARATUS FOR MEASURING OUTSIDE DIAMETER AND WALL THICKNESS OF A TUBE AND HAVING TEMPERATURE COMPENSATION

[75] Inventor: Zoran R. Kuljis, Gramby, Conn.

[73] Assignee: Combustion Engineering, Inc., Windsor, Conn.

[21] Appl. No.: 617,802

[22] Filed: Nov. 26, 1990

[51] Int. Cl.$^5$ .................................... G01N 29/20
[52] U.S. Cl. .............................. 73/597; 73/622
[58] Field of Search .......... 73/620, 622, 637, 638, 73/627, 597; 367/104, 902

[56] References Cited

U.S. PATENT DOCUMENTS

| | | | |
|---|---|---|---|
| 3,121,324 | 2/1964 | Cowan | 73/622 |
| 3,176,263 | 3/1965 | Douglas | 367/191 |
| 3,426,437 | 2/1969 | Rebhun et al. | 73/622 |
| 3,929,006 | 12/1975 | Boggs et al. | 73/622 |
| 3,930,404 | 1/1976 | Ryden, Jr. | 73/622 |
| 4,049,954 | 9/1977 | Da Costa Vieira et al. | 73/627 |
| 4,089,227 | 5/1978 | Falgari et al. | 73/622 |
| 4,254,660 | 3/1981 | Prause | 73/622 |
| 4,487,072 | 12/1984 | Livingston | 73/622 |
| 4,520,672 | 6/1985 | Saint-Amour | 73/622 |
| 4,670,211 | 6/1987 | Gaunt et al. | 376/245 |
| 4,740,146 | 4/1988 | Angelbeck | 73/622 |

FOREIGN PATENT DOCUMENTS 2144852A 3/1985 United Kingdom.

OTHER PUBLICATIONS

Patent Abstract of Japan, Akio Takahashi, re JP/59-57109, vol. 8, No. 159, p. 289, Jul. 24, 1984.

Primary Examiner—Hezron E. Williams
Assistant Examiner—Rose M. Finley
Attorney, Agent, or Firm—Ronald P. Kananen

[57] ABSTRACT

An apparatus for measuring an outside diameter of a cylindrical object moving along an axis includes a plurality of fixed transducer pairs for providing a continuous outside diameter profile of the moving cylindrical object. The sensors are located in a holder enveloping the cylindrical object. Temperature compensation for changes in temperature in the coupling medium include a wire reflector in an ultrasonic path at a fixed distance from a face of the sensor. Various types of outputs, including a continuous profile of the cylindrical object are provided. A method of measuring the outside diameter of such cylindrical objects while moving is also disclosed.

17 Claims, 5 Drawing Sheets

FIG. 11B $$D_{ext} = DO - \frac{(T1 + T2)V}{2}$$

ULTRASONIC METHOD AND APPARATUS FOR MEASURING OUTSIDE DIAMETER AND WALL THICKNESS OF A TUBE AND HAVING TEMPERATURE COMPENSATION

BACKGROUND OF THE INVENTION

This invention relates to a method and apparatus for the measurement of the outside and inside diameters of a tubular object by ultrasonic techniques. More particularly, this invention relates to a method and apparatus including a plurality of fixed ultrasonic transducers in a fixed, phased array for dimensionally measuring an axially-mobile tubular object, such as a nuclear fuel rod, which includes calibration and temperature compensation. Still more particularly, this invention relates to a method and apparatus having a plurality of ultrasonic transducers in a fixed phased array about the circumference of an axial space through which a hollow tubular member passes, the phased array including a calibration and compensation wire in an ultrasonic circuit with the transducer, for calibrated and compensated measurement of the wall thickness, outside diameter, and inside diameter of the mobile tube.

In the prior art, a number of systems are known which relate to the measurement of the dimensions of an object by the emission of ultrasonic pulses and the reception of the echoes returned by the object, whereby the time separating transmission and the reception of the differing echoes enables a determination of the distance separating the various echo generating obstacles from the pulse-emitting sensor. Such techniques have been used to measure the dimensions of an object, such as a tubular object, for example, as shown in U.S. Pat. No. 3,929,006 (a system for measuring ultrasonically cable jacket thickness); the eccentricity of a tubular object, as in U.S. Pat. No. 3,426,437 and in U.S. Pat. No. 4,520,672; and thickness measurements by the use of ultrasonic probes for extruded plastic tubing as in U.S Pat. No. 4,740,146. Such systems are distinguishable from the use of an ultrasonic inspection device intended to measure and detect material flaws, such as in U.S. Pat. No. 3,121,324 and U.S. Pat. No. 4,487,072.

In a number of applications, knowledge of the dimensions and wall thickness of a tubular member are of interest. For example, in the nuclear industry, the integrity of the reactor control rod elements is directly dependent upon the strength of its cladding tube wall. In normal operating conditions, the reactor control rod elements are exposed to extremely complex thermodynamic and hydromechanic fluctuations. As a result of these conditions, rod vibration against its supporting structure in the reactor results in wearing of the tube wall in its cladding. The extent of this wear is directly related to rod integrity. Accordingly, monitoring and accurate measurements of these conditions are important steps in determining the status of control rod integrity. Thus, a number of systems and apparatus have been developed or proposed for such monitoring and measuring steps.

Based upon the measurements of the extent of wear of a control rod, it is possible to appropriately apply acceptance or rejection criteria for continuous operation of the control rod elements in the reactor.

In addition to the wear of a control rod element, some types of control rod elements because of the swelling of material in the hostile nuclear environment cause the cladding to bulge on the side of the tube. When bulges exceed a limited diameter, they can obstruct free rod movement through the structure in the reactor core. Thus, measurements of the eccentricity of the rod are thus important to determine when to remove the rod from the reactor in order to avoid its jamming in the supporting structure.

Presently-used techniques for measuring the control rod element profile are based generally on the use of eddy current principles. Two methods are used, one with a direct measurement of the rod surface lift-off effect on the array of stationary coils in the measuring fixture, while the second uses an indirect measurement of the lift-off effect through the mechnical fringes that ride the rod surface. These methods have limitations due to other electromagnetic property changes that can be encountered along the rod that affect the eddy current signal and significantly reduce measurement resolution. On the other hand, the magnitude of the signal amplitude responses limits the measuring range for what has been found impractical, especially when measuring the bulges. These two methods are widely used throughout the industry for production inspections on the control rod elements in operating nuclear power plants.

In addition to these production measuring techniques, a special test with a rotating ultrasonic probe has also been developed. This special test is used only for a limited rod location due to the very slow axial scanning speed. The results of these measurements, due to the complexity of the central rotational motion limitations, can be executed on the signal resolution. Thus, the method is primarily used to profile an outside surface of the rod as a follow up on an eddy current indication, or for inspecting an area where eddy current coverage is limited due to damages in the electromagnetic properties in the rod materials.

Accordingly, it is an overall objective of the invention to provide an ultrasonic measuring technique for directly measuring wall thickness with a plurality of focused ultrasonic sensors in an array mounted on a rod manipulator of the type conventionally used in the art. As is well known in the art, control rods which have operated within a nuclear reactor will suffer from radiation induced changes, as well as wear, cladding defects, swelling or ovality as noted above. In deciding whether to replace the rods or to continue their use, measurements of the type noted above are made to evaluate potential defects. A conventional control rod testing apparatus has an apparatus for supporting a plurality of elongated tubular control rods which are lowered through the test apparatus while located within the fuel storage pool. The testing apparatus may be a completely independent fixture, as noted in U.S. Pat. No. 4,670,211, assigned to the assignee of this invention, or may be a fixture secured to the top of a fuel bundle for the purpose of using the control rod guide tubes within the fuel bundle to aid in guiding the rods. The testing apparatus includes a guidance opening for all of the fingers of the control rod to be tested, but only selected portions will have a testing subassembly located within them.

It is thus an objective of this invention to provide a fixed ultrasonic testing mechanism, including a sensor and the physical holders constructed in a manner in which a conventional apparatus of the type described may readily be used to measure a moving tubular element.

It is another problem in the art in utilizing an ultrasonic test method and apparatus with a coupling liquid to compensate for changes of the sound velocity of the coupling liquid as a function of temperature. It is well known that when testing workpieces with ultrasonic energies the energy is cyclically transmitted from an electroacoustic transducer to the workpiece via a coupling liquid, which usually is water. The ultrasonic energy transmitted is reflected at the workpiece surface at an acoustic discontinuity within the workpiece and also at the rear surface of the workpiece. The transit time of the ultrasonic pulse while traversing the coupling liquid is an important parameter for determining the geometry of the workpiece under test. However, for accurate measurement, it is desirable that the acoustic velocity of the coupling liquid remain constant during the measuring period, or that an arrangement be provided for compensating the system for the influence of temperature. In U.S. Pat. No. 4,254,660, that problem is recognized and several solutions are discussed. The first includes regulating the temperature of the coupling liquid which, in this environment, is impractical. The second arrangement compensates for the sound velocity and is a mechanism of interest for this invention. Thus, it is desired to provide a compensation circuit in cooperation with the fixed phased array of ultrasonic transducers for compensating for temperature changes of the coupling liquid.

In addition, quality control requires that the instruments be periodically calibrated. Thus, it is another overall aim of this invention to provide a calibration circuit and mechanism in cooperation with the phased transducer array so that the circuit can be periodically calibrated to determine its accuracy and the functioning of any particular ultrasonic transducer.

Accordingly, it is an overall objective of this invention to provide a method and apparatus for ultrasonically measuring the outside diameter, inside diameter, and wall thickness of a tubular element in cooperation with a compensation/calibration system.

It is an additional overall object of this invention to provide an array of ultrasonic transducers circumferentially spaced about an axially-movable tube for directly measuring the diameter and wall thickness, while producing a profile of the outside diameter of the rod on a continuous basis.

It is an additional object of this invention to provide a fixed array of ultrasonic transducers spaced circumferentially about a path of travel for a hollow rod for directly measuring the wall thickness and outside diameter of the rod and arranged so that the transducers are structurally adapted for use in a rod tester of the conventional type used in the nuclear industry.

It is still another object of this invention to provide a simple yet accurate method of temperature compensation for temperature changes in the coupling fluid located between the transducer face and the rod surface.

It is an additional object of this invention to provide a wire which acts as a reflector surface for a transducer pulse acting as a reference because its location from the transducer face is fixed, whereupon the instrument may be calibrated and the readings compensated for changes in temperature of the coupling liquid, without requiring an additional transducer.

It is still another object of this invention to provide a reflector wire of the type described, in cooperation with each of a plurality of ultrasonic sensors positioned about the circumference of a path of travel of a nuclear control rod.

These and other objectives of the invention will become apparent from the detailed description of the drawings, taken in conjunction with the following written description of the invention.

BRIEF SUMMARY OF THE INVENTION

Directed to achieving the foregoing objectives, and overcoming the problems of the prior art, the method and apparatus according to the invention include a plurality of ultrasonic sensors in a fixed array, spaced about equally about the circumference of a path of travel for a rod along an axis located in a focused zone for ultrasonic energy transmitted from and reflected to an ultrasonic transducer. The transducers are fixed in a holder which permits easy access for replacement of the transducer in a conventional control rod apparatus used in the nuclear industry. With this device, the rod traverses an axial path intermediate the transducers so that time of flight signals for the acoustic pulses reflected from the outside diameter are used to determine the outside diameter of the tube in cooperation with the signals from a transducer located oppositely from the subject transducer. Thus transducer pairs, located 180 degrees apart, are used so that axial misalignment of the tube within the holder is of no consequence to the accuracy of the signals. A second reflected pulse from the inside diameter of the tube is used in a computational device available in the art for determining the wall thickness. Thus, a first feature of the invention is to provide production inspection with an array of eight or more focused ultrasonic sensors which scan through the entire moving control rod length at the maximum practical speed of draw of the rod through a rod manipulator available in a spent fuel facility in a nuclear power plant, at an average speed of about 1.25 inches per second. Each of the eight equally-spaced ultrasonic sensors performs measurement along the full rod length and additional sensors may be used in the array if greater accuracy is needed.

According to the invention, the ultrasonic sensors are equally spaced about the circumference of the travel path, and the distance between the front surface of these ultrasonic sensors and the outside surface of the rod is almost constant. This feature permits the focal spot of the sensor to be minimized in size at the measuring surface, improving the accuracy of the device. The instrumentation for each sensor provides two types of outputs. First, by measuring the time of flight between the generated pulse and its echo from the rod surface, the rod outside profile is monitored on a continuous, real time basis, and a strip chart readout of the profile is provided. Second, by measuring the time of flight between two consecutive reflected pulses from the cladding tube, the inside diameter and actual wall thickness are determined.

A temperature compensation circuit device, in the form of a wire or wire rod pulse reflector located at a predetermined fixed distance from the surface of the ultrasonic sensor, provides continuous monitoring of the amplitude and time of flight responses between the sensor and the wire type reflector. The wire type reflector is located in the sound beam path between the transducer and the rod outside surface. By using a wire type reflector in such a manner, and located at that location, the need for a separate sensor for temperature compensation for the coupling fluid is eliminated. The information from the wire reflector may also be used for on-line calibration verifications. Such a device provides constant monitoring of the system calibration and thus permits continuous production measurements without interruption for intermediate calibration verification. This monitoring can also be provided through the reflections from diametrically-opposed sensor front surface, when the sensor holder is empty.

The data processing for the measurement data includes means for arithmetically combining the measurements from two diametrically opposed transducers and calculating the arithmetical average of the times of flight to provide information on the rod diameter while avoiding the need for rod centering inside the sensor holder. Routine deviations in the radial directions between the rod and the sensor holder are compensated by this feature.

These and other features of the invention will become apparent from the detailed description of the invention which follows, taken in conjunction with the accompanying drawings.

BRIEF DESCRIPTION OF THE DRAWINGS

FIG. 9 shows the outer portion of the sensor holder which cooperates with the inner portion shown in FIG. 1 as best seen in FIG. 5 wherein a top view of the outer portion is shown in FIG. 9A; a top view is shown in FIG. 9B; and a partially-broken cross-sectional view is shown in FIG. 9C;

FIG. 11 is a diagrammatic illustration of the time of flight parameters used by the computing mechanism to calculate the external diameter from data provided by opposed transducers wherein

DETAILED DESCRIPTION OF THE PREFERRED EMBODIMENTS

Figure 2:
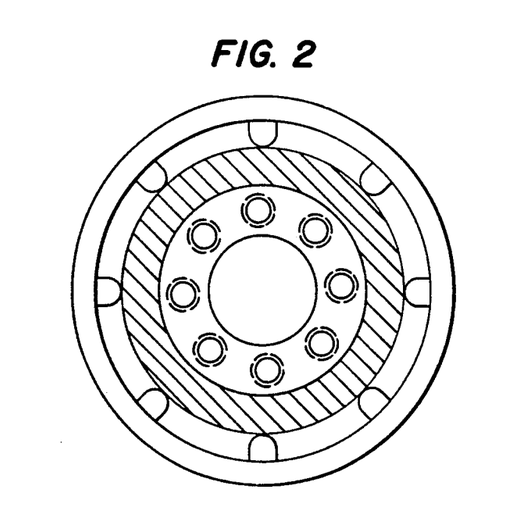
FIG. 2 is a view taken along line 2—2 of FIG. 1 showing a cross-section of a rod element and an eight-sensor array.
Figure 3:
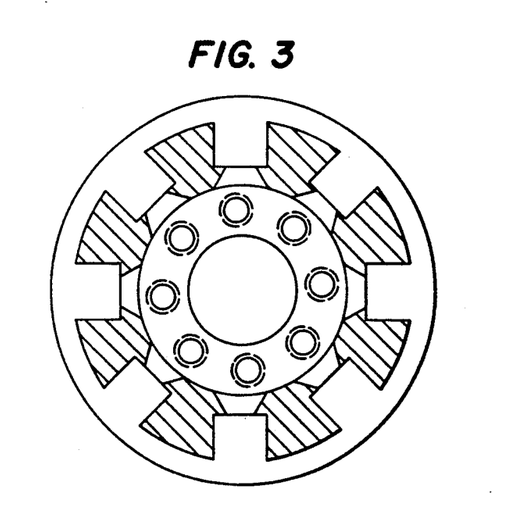
FIG. 3 is a view taken along line 3—3 of FIG. 1 showing in cross-section the sensor holder at the level of the sensors.
Figure 4:
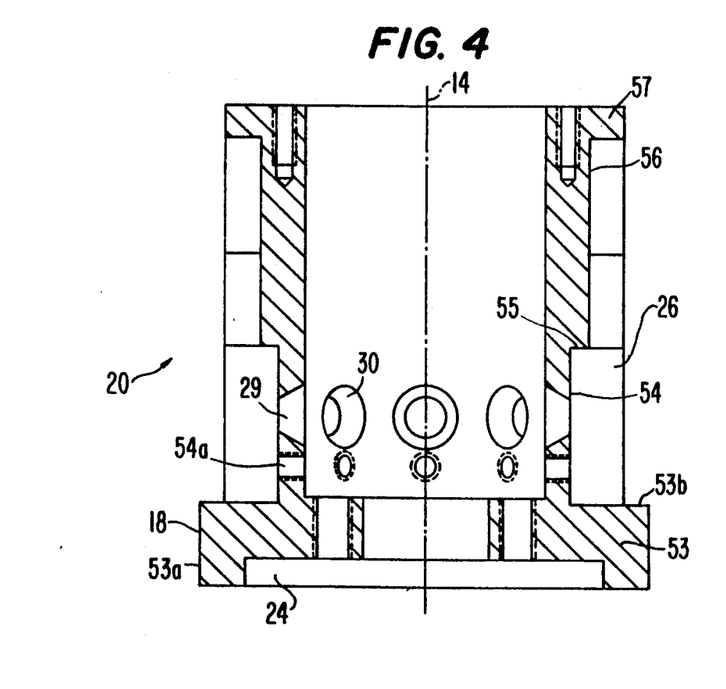
FIG. 4 shows a cross-sectional view of an inner portion of the sensor holder, including a cross-section of the inner portion of the sensor holder.
Figure 5:
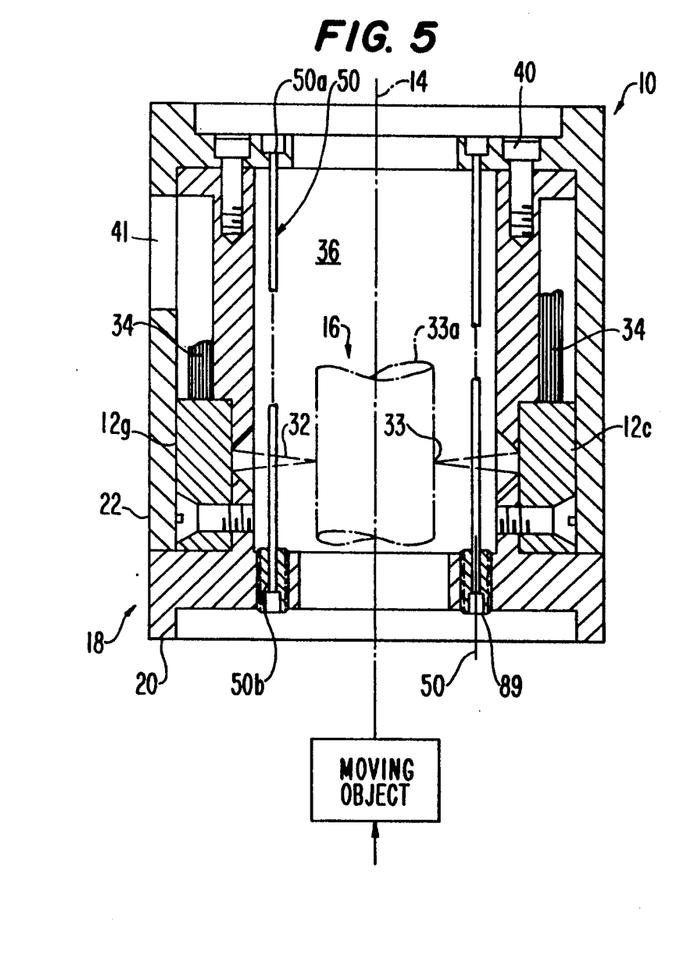
FIG. 5 shows an assembly view, in cross-section, of the inner and outer portion of the sensor holder, the sensors, and the wire reflector compensating member.
Figure 6:
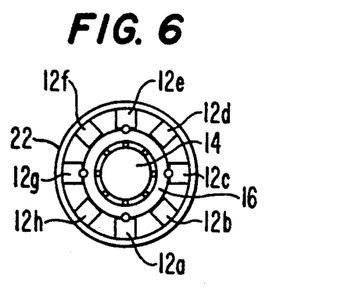
FIG. 6 is a top view of the assembly of FIG. 5.
Figure 9A:
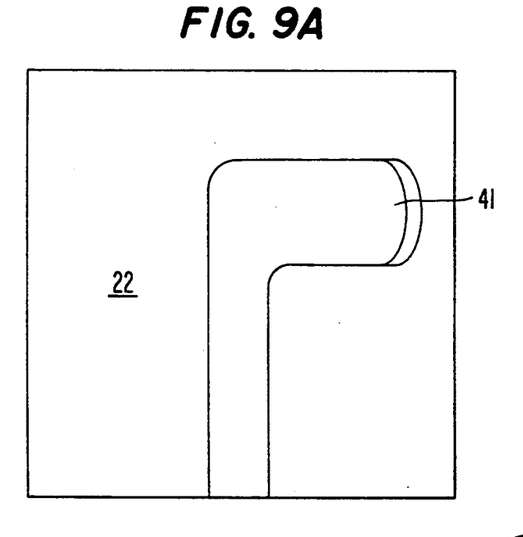
Figure 9B:
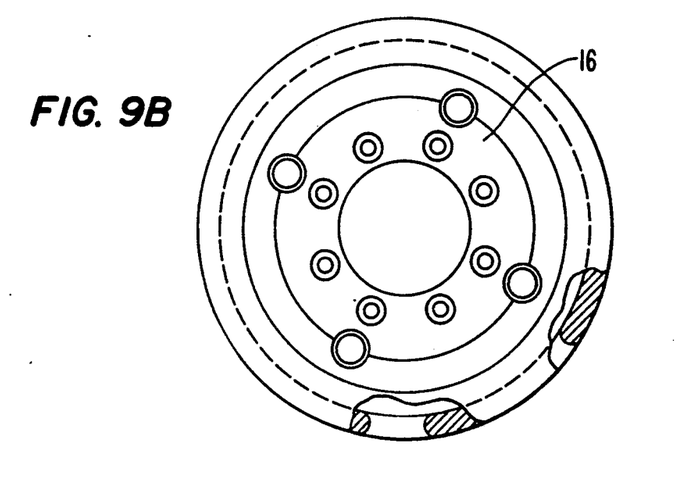
Figure 9C:
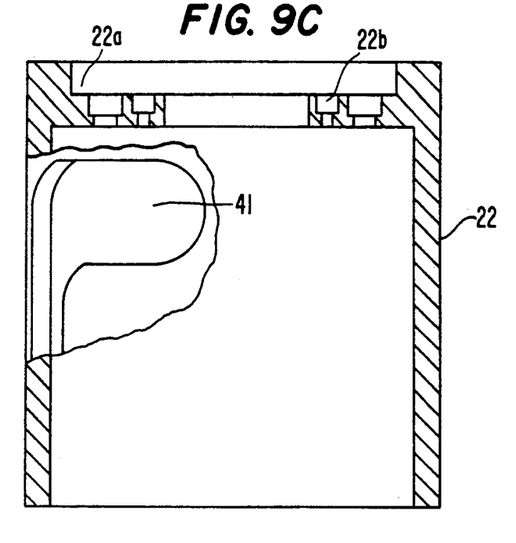

As shown in FIGS. 1-9, an apparatus for directly measuring wall thickness of a control rod is designated generally by the reference numeral 10. The apparatus 10 includes a plurality of sensors or ultrasonic transducers designated generally by the reference numeral 12, and representatively including ultrasonic transducers 12a through 12h. The transducers are equally-spaced about an axis 14 along which a rod 16 axially travels. The sensors 12 are located in a sensor holder designated generally by the reference numeral 18 and made up from an inner sensor holder 20 and an outer sensor holder 22 as best seen in FIGS. 4, 5 and 9.

Figure 1:
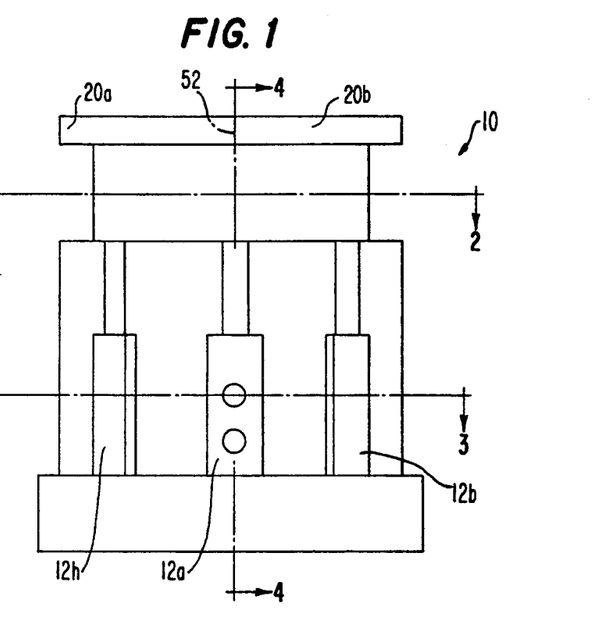
FIG. 1 is a side plan view of an inner portion of a sensor holder used in the assembly of FIG. 5.
Figure 7:
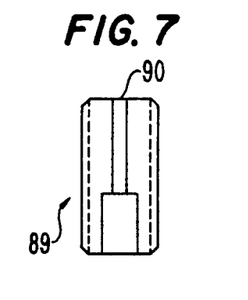
FIG. 7 is a side cross-sectional view of a threaded bored screw for tightening the wire reflector type compensating member.
Figure 8:
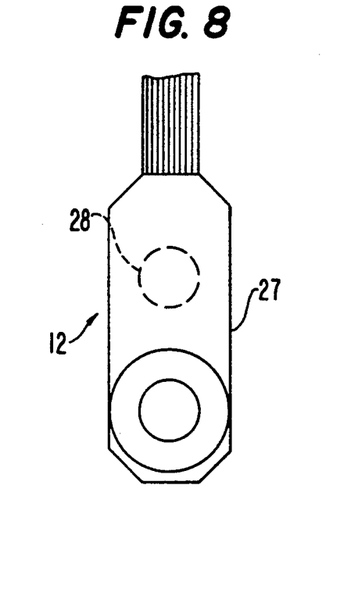
FIG. 8 is a front view of a typical ultrasonic sensor used in the assembly of FIG. 5.

The inner sensor holder 20 rests on a flange 24 forming part of a rod holding apparatus (not shown) and secured thereto. The inner sensor holder 20 defines a generally rectangular recess 26 having a shape for accommodating a sensor 28 fixed in a sensor housing 27 in the recess. The sensor holder further defines an opening 29 having a truncated wall 30 communicating with the sensor face 31 to emit bursts of ultrasonic energy diagrammatically shown by the reference numeral 32 to emanate therefrom to a focused target point 33 at the focal surface 33a of the rod 16. Each sensor 12 includes leads 34 emanating therefrom connected to suitable electronics (as seen in FIG. 7) for determining the time of flight for controlling the generation of pulses, monitoring the time of flight of the respective echoes, performing the desired calculations to determine outside wall diameter, inner wall diameter, and wall thickness of the rod 16, and providing the desired data readouts.

Figure 12:
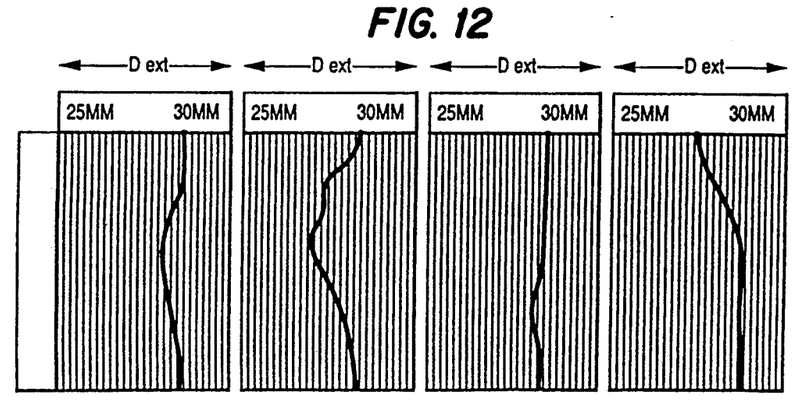
FIG. 12 is a representative continuous display of the measurement of the external diameter of a measured rod while mobile.

More specifically, when a sensor 12 issues an ultrasonic pulse burst 32, the energy traverses the water coupling medium 36 and impinges on the focused spot at the rod surface 33. The pulse 32 is reflected from the rod surface 33 back to the face 31 of the sensor 12. The elapsed time between the issuance of the ultrasonic pulse and its return is measured to determine time of flight through the coupling. By comparing data, as will be discussed, generated by diametrically opposed sensors, the outside diameter of the rod 16 may be directly measured. Thus, sensors 12a and 12e; 12b and 12f; 12c and 12g; and 12d and 12h operate in respective pairs to determine the outside diameter of the rod 16. By providing signals from opposed pairs or sensors 12, in accordance with the invention, deviations of the center line of the rod 16 from the axis 14 can be taken into account so that precise centering of the rod in the rod holder is not required. In accordance of the invention, the rod 16 is drawn axially along the axis 14 so that the outside diameter of the rod is directly measured as a profile of the rod and thus a strip chart, as shown in FIG. 12, can be prepared showing the profile of the rod, as taken while the rod is moving.

The echo also penetrates the rod surface 33 and is reflected from the inside diameter of the rod to the face 31 of the sensor. The electronics of FIG. 10 determines, as is customary in the art, the difference in time of flight between the first reflected pulse and the second reflected pulse to determine directly the wall thickness of the two in an area adjacent each respective sensor 12. Usually, variations in wall thickness about the circumference is of lesser concern in considering reliability criterion, so that the proposed eight sensors 12a through 12h are sufficient for determining the rod thickness 16. However, additional sensors could be provided in associated pairs to obtain more measurements about the circumference for the rod thickness. In addition, the electronics package shown in FIG. 10 could provide comparisons of the wall thickness from the array and issue a signal when the wall thickness deviates beyond some predetermined expected norm about its entire circumference. Such electronics would provide an indication of a wall which is significantly thinned at one side but which otherwise represents a satisfactory thickness about its circumference.

The sensor holder 18 also includes an outer member secured as by a fastener 40 to the inner member. That member acts essentially as a cover plate with a vent opening 41 to permit the leads 34 to exit therefrom.

It is another significant feature of the invention to provide a temperature compensation and reliability circuit in the form of a wire reflector 50 secured at its respective ends to the sensor holder 20. The end 50a is fixed in an opening 20b in an upper annular surface 22a in the outer holder 22, while the lower end 50b is secured in a bore 90 in a threaded member 89 secured in an opening 20b in a lower annular member of the inner holder 20. The thread and bored member 89 is used to tighten the wire member by rotating the member 89 to withdraw it slightly from the opening 20b when the wire 50 is secured thereto. The wire reflector 50 is located at a predetermined fixed distance from the surface 31 of the ultrasonic sensor 12. By recording the echo from the sensor 12, which is in time the first reflected pulse, the time of flight at the initiation of a test run can be determined. Thus, by continuously recording such data, variations in the time of flight through the coupling medium 36 may be compared by the electronics package to compensate for temperature changes in the coupling. Thus, as the temperature of the coupling medium changes, the time of flight changes so that a correction factor in the form of the ratio of the later observed time of flight to the initially observed time of flight may be used to correct, in a linear manner, the time of flight data for determining wall thickness and inside diameter. Thus, the unit automatically compensates for temperature variations.

In addition, those data may be used for reliability criterion to provide continuous data to indicate the operability of each sensor 12. Thus, if any one sensor 12 is providing data which deviates from the norm, or from that observed at the beginning of a run, an indication of sensor malfunction is immediately available.

As shown in FIGS. 2 to 4, the structure of the inner holder 20 is a substantially circumferential member secured about the axis 14 and to a portion of the rod supporting structure (not shown) in a conventional manner. For example, the inner sensor holder can be made in two portions along a parting line 52 so that they can be secured in a conventional manner by fastening one part 20a to the other 20b. The sensor holder includes a bottom portion 53 defining the outermost diameter of the sensor holder 20. A surface of the member 53a defines a recess with a flange member 53b, sized to cooperate with the lower flange 53, which also defines an upper surface 53b which defines the lower surface of the generally rectangular recess having an arcuate front surface for receiving the sensors 12 therein. Thus, the surface 53b merges with a surface 54 which is somewhat arcuate in nature bounded at its other end by a surface 55 which merges into an axially extending surface 56 terminating in the distal flanged portion 57. The flanged portion 57 includes a recess for receiving the fastening member 40 as described in connection with FIG. 1.

The surface 54 includes an opening 54a for receiving a fastening member for securing the sensor 12 within the rectangular opening. The sensor opening 29 is also defined by that surface 54. Thus, the members shown in FIGS. 8 and 9 cooperate with the member shown in FIGS. 2 to 4 to form the structure as shown in FIG. 5.

Figure 10:
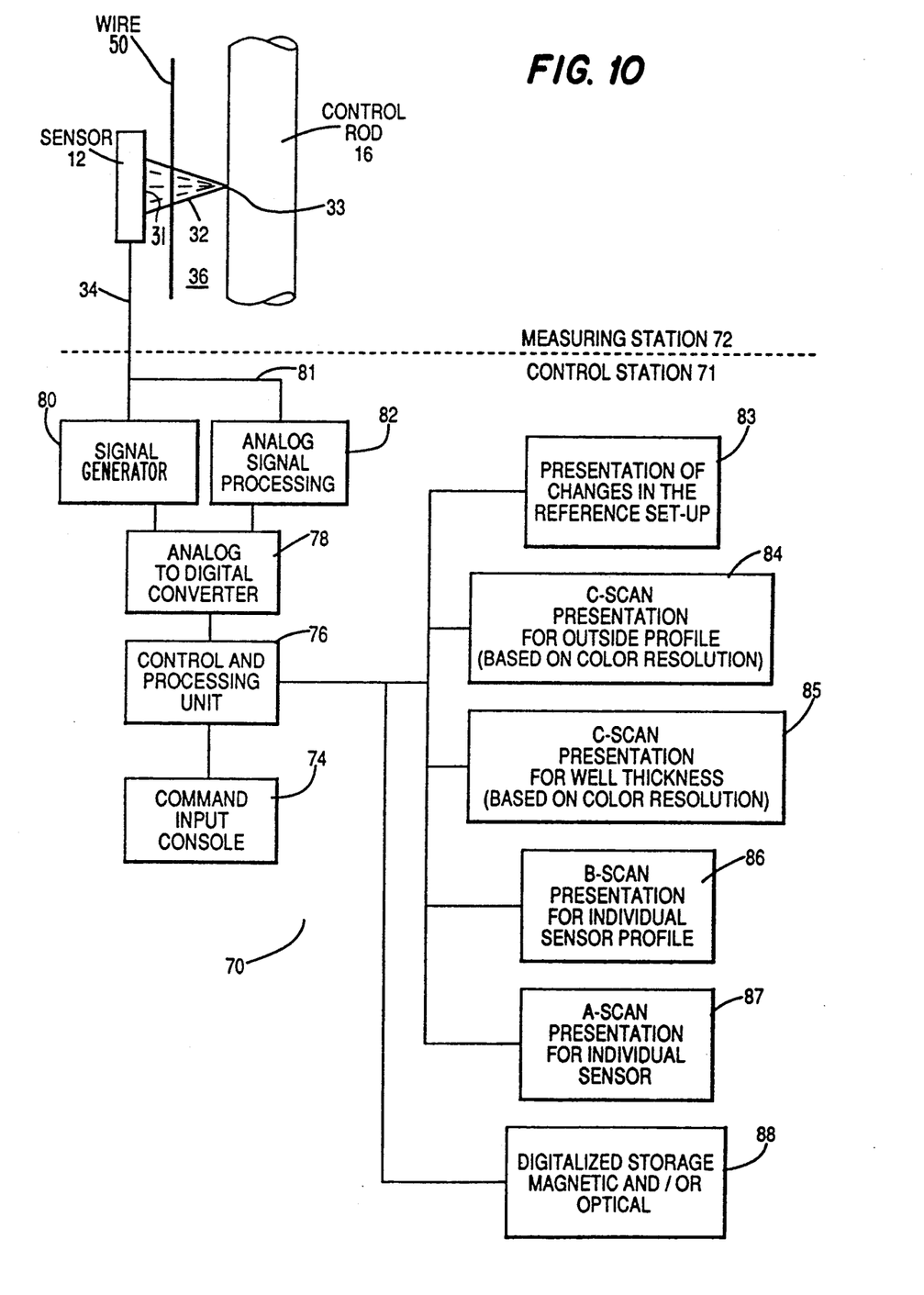
FIG. 10 is a block diagram of a signal generation and computation system for use with the apparatus according to the invention.

FIG. 10 shows, in a block diagram, a computation and control circuit designated generally by the reference numeral 70 and located at the control station designated generally by the reference numeral 71. The sensor 12 and the apparatus for moving the control rod 16 along the axis 14 are located at the measuring station 72.

The control circuit 70 includes means for controlling the emission of a pulse through a command input console 74 for controlling a control and processing unit 76 having an analog-to-digital converter 78 for controlling a signal generator 80. The signal generator produces the pulses on the leads 34 to the sensor 12 to provide ultrasonic pulse bursts as previously described. The echo signals are received by the sensor and provided on the line 34 to the line 81 to the analog signal processing circuit 82 which is connected to the A to D converter 78. Thus, the signal is indicative of the time of flight of the pulse echo carefully measured through the cooperation of the elements of the circuit 70. The control and processing unit processes the time of flight data to provide various types of outputs. First, it presents changes in the reference set up to test both the operability of a sensor 12 as well as changes in the ambient temperature of the coupling medium as previously described. That function of a control and processing unit 76 is indicated in the block 83.

The unit also provides, as shown in block 84, a C-scan presentation for the outside profile based upon color resolution. That output for the C-scan presentation of the outside profile is provided by the control and processing unit 76 as will be discussed in connection with FIG. 11.

The control and processing unit 76 also provides a C-scan presentation for the wall thickness as indicated in a block 85 based upon color resolution. That wall thickness represents the time of flight between an echo representing the outside surface of the wall and a second echo representing the inside of the wall when converted to an appropriate unit of measurement, such as inches, millimeters, or the like.

A B-scan presentation for an individual sensor profile is also provided by the control and processing unit 76, as shown by the block 86. Presentation for an individual sensor is functionally shown by the block 87.

It is a feature of the invention that digitilized storage of the collected data may be provided on any suitable magnetic or optical and coating mechanism, as shown in the block 88.

Figure 11A:
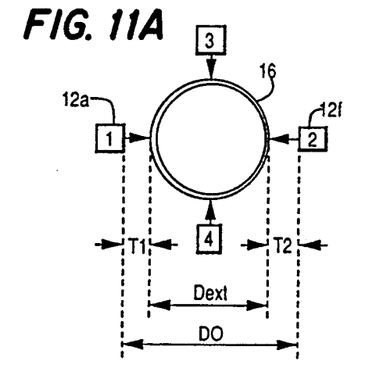
FIG. 11A shows a representation of the system.
Figure 11B:
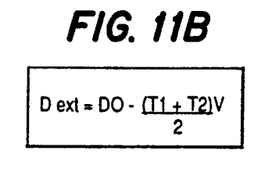
FIG. 11B shows the applied formula.
Figure 11C:
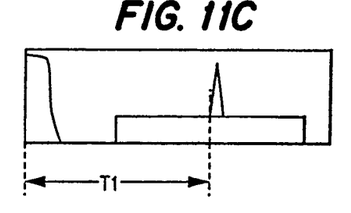
FIG. 11C is a representative chart readout of the reflected pulse.

The external diameter profile measurement has an interesting feature shown in FIG. 11, comprising FIGS. 11A, 11B and 11C. The locations of a sensor pair 12a and 12f as shown in FIG. 11A defining respectively times of flight T1 and T2 from the outside diameter of the tube 16. Since the distance between those sensors is fixed at $D_0$ it is therefore possible to calculate the external diameter of the tube according to the equation set forth in FIG. 11B. Such a technique accommodates variations in the tube 16 relative to the axis.

FIG. 11C shows a representative pulse at time T, for the setup of FIG. 11A. FIG. 12 shows a continuous profile of the rod surface as previously described.

It will be understood that various changes in the details and arrangements of parts and operating conditions which have been hereinabove described and illustrated in order to explain the nature of the preferred embodiment of this invention may be made by those skilled in the art within the principles thereof, and that reference should be made to the following appended claims for determination of the scope of the invention.

I claim:

1. An ultrasonic system for determining the outside diameter of a continuously moving cylindrical object, comprising:
   means for moving a cylindrical tubular object along an axis;
   means containing a coupling medium for transferring ultrasonic energy to said object for use in obtaining data for the measurement of an outside diameter of said tubular object disposed substantially adjacent said coupling medium in said transferring means;
   a plurality of transducer sensors fixedly mounted externally about the circumference of said tubular object in said transferring means and immersed in said coupling medium for producing ultrasonic energy upon activation thereof, said transducer sensors comprising at least a diametrically opposed pair of transducers mounted diametrically opposite each other relative to said tubular object for obtaining data for use in measuring the outside diameter of said object on a continuous basis;
   circuit means operably connected to said transducers for producing electronic signals corresponding to the energy reflected to said transducers from said object and processing said signals to provide output signals representative of the outside diameter of said tubular object being measured; and
   means operably connected to said transfer means in association with said coupling medium for compensating for temperature variation in said coupling medium, said compensating means further comprising means for taking a first measurement for providing a reference and means for taking subsequent measurements for determining changes in coupling medium temperature.

2. The system as set forth in claim 1, further including a plurality of pairs of said transducers located about the circumference of said cylindrical object.

3. The system as set forth in claim 1, wherein said cylindrical object is a tubular object, said transducer means cooperating with said circuit means for providing an indication of the wall thickness of said tubular object.

4. The system as set forth in claim 1, wherein said compensating means includes a wire reflector located intermediate a face of a sensor and a surface of said tubular object, said electronics periodically determining the time of flight of an ultrasonic echo from said sensor to said wire reflector for compensating for temperature variations in said medium.

5. The system as set forth in claim 1, wherein said transferring means includes a sensor holder having an inner member having a substantially circular housing and defining therein an opening structurally adapted for receiving a sensor housing therein so that a face of said sensor can emit ultrasonic energy therefrom through s id coupling medium.

6. The system as set forth in claim 1, wherein said circuit means provides a continuous indication of the outside profile of said cylindrical object.

7. The system as set forth in claim 1, wherein said circuit means provides a continuous presentation of wall thickness.

8. The system as set forth in claim 1, wherein said circuit means provides a scan for individual sensor profiles.

9. The system as set forth in claim 1, wherein said circuit means includes means for providing a scan for each individual sensor.

10. The system as set forth in claim 1, wherein said circuit means stores said information in magnetic or optical media.

11. The system as set forth in claim 1 wherein said circuit means includes means for averaging the time of flight from an opposed pair of sensors to calculate external diameter of said moving tubular object to eliminate effects of object eccentricity.

12. A structural member structurally sized and adapted to envelop an axis along which a tubular member travels comprising:
   a sensor having a sensor front surface for emitting an ultrasonic pulse along an ultrasonic path to a focused spot at an outer surface of said tubular member;
   a coupling medium located intermediate said sensor front face and said outside surface of said tubular member;
   a wire reflector secured to said sensor holder at its opposed ends and having a portion of said wire located in said ultrasonic path; and
   means for providing an output pulse indicative of the time of flight of an ultrasonic pulse from said sensor front surface to said wire reflector for use as a reference and for providing subsequent output pulses indicative of the times of flight from said sensor front surface to said wire reflector, whereby said temperature compensation is obtained by comparing the times of flight taken at different times with said reference.

13. The sensor holder as set forth in claim 12, wherein said sensor holder provides support for a plurality of diametrically opposed sensors, each of which is associated with a wire reflector to provide a compensating signal.

14. The sensor holder as set forth in claim 13, further including a movable outer member for covering said sensor and for permitting easy access to said sensor in said opening in said inner sensor holder for replacement.

15. A method for determining the outside diameter of a moving tubular member, comprising the steps of:
   passing a tubular member in a linear axial path of movement through an ultrasonic coupling medium;
   impinging ultrasonic energy through said medium on the exterior surface of said tubular member while said tubular member is moving to produce rejected pulses indicative of the outside diameter of said tubular member;
   converting said reflected pulses into electrical signals for processing to determine the outside diameter of said tubular member;
   providing a wire reflector member in said ultrasonic energy path at a fixed distance from a surface of an ultrasonic energy emitter; and
   measuring the time of flight of said ultrasonic energy to said wire reflector so that to provide a reference; and
   subsequently measuring said time of flight from said reflector to determine changes in coupling medium temperature.

16. The method as set forth in claim 15 wherein the step of converting includes a step of averaging said reflected pulses from an opposed pair of sensors impinging ultrasonic energy on said tubular member to calculate said external diameter while eliminating effects of object eccentricity.

17. An ultrasonic system for determining the outside diameter of a continuously moving cylindrical object, comprising:

means for moving a cylindrical tubular object along an axis;

means containing a coupling medium for transferring ultrasonic energy to said object for use in obtaining data for the measurement of an outside diameter of said tubular object disposed substantially adjacent said coupling medium in said transferring means;

a plurality of transducer sensors fixedly mounted externally about the circumference of said tubular object in said transferring means and immersed in said coupling medium for producing ultrasonic energy upon activation thereof, said transducer sensors comprising at least a diametrically opposed pair of transducers mounted diametrically opposite each other relative to said tubular object for obtaining data for use in measuring the outside diameter of said object on a continuous basis; and circuit means operably connected to said transducers for producing electronic signals corresponding to the energy reflected to said transducers from said object and processing said signals to provide output signals representative of the outside diameter of said tubular object being measured, wherein said circuit means includes means for averaging the time of flight from an opposed pair of sensors to calculate an external diameter of said moving tubular object to eliminate effects of object eccentricity, said circuit means further including means for performing a first measurement for providing a reference and means for performing subsequent measurements for determining changes in coupling medium temperature.

* * * * *